(No Model.)  2 Sheets—Sheet 1.
A. J. ROBERTSON.
CONDUIT ELECTRIC RAILWAY.
No. 462,672. Patented Nov. 3, 1891.
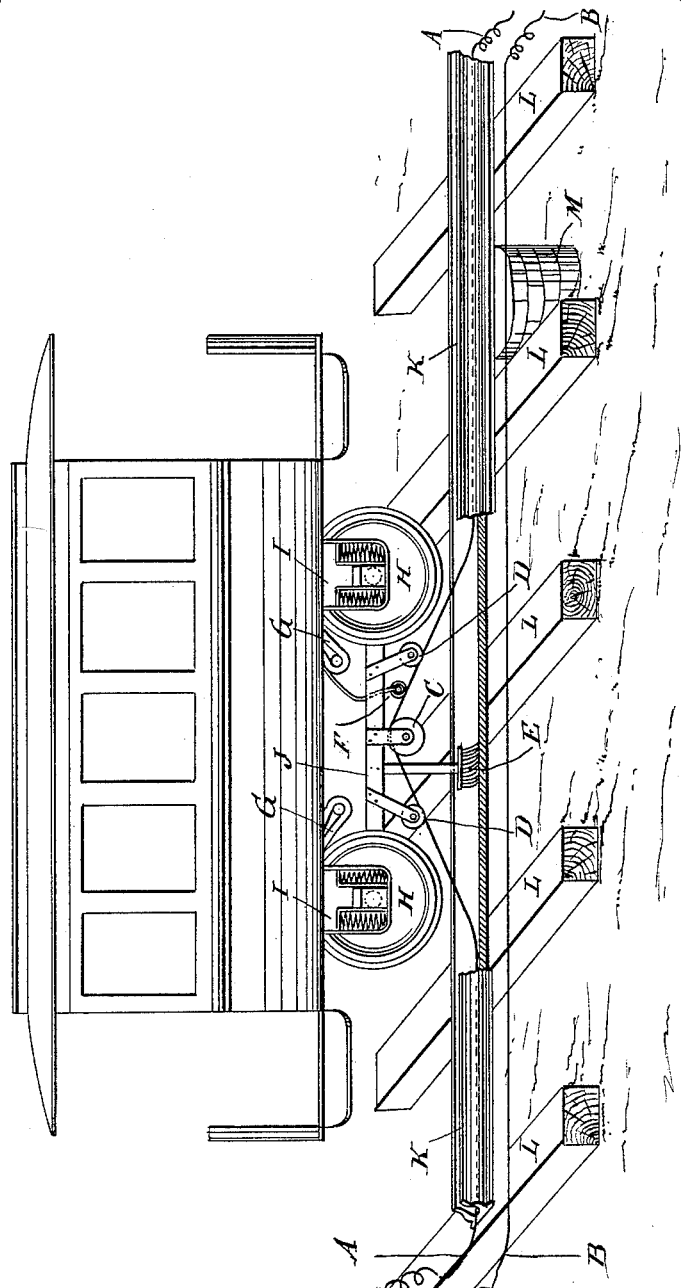
Fig. 1.
Fig. 2.
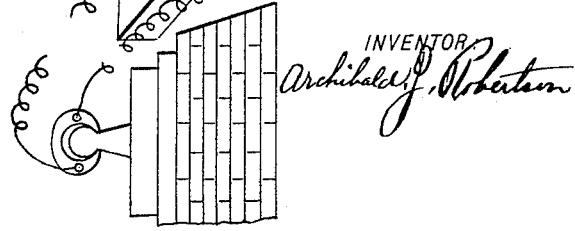
WITNESSES:
Charles C. Goodale
Ira Taylor
INVENTOR
Archibald J. Robertson

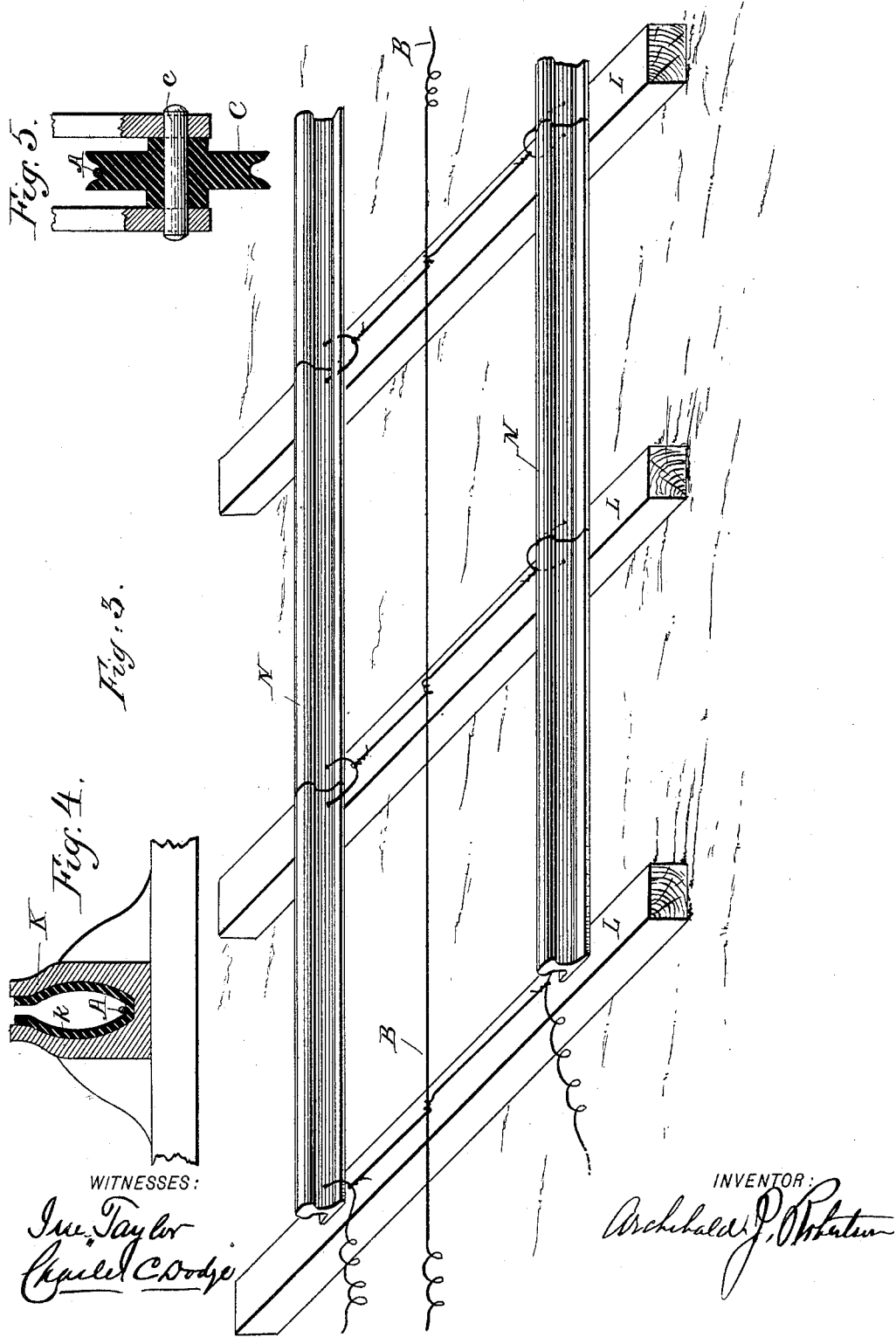

UNITED STATES PATENT OFFICE.

ARCHIBALD J. ROBERTSON, OF NEW YORK, N. Y.

CONDUIT ELECTRIC RAILWAY.

SPECIFICATION forming part of Letters Patent No. 462,672, dated November 3, 1891.

Application filed December 10, 1890. Serial No. 374,213. (No model.)

*To all whom it may concern:*

Be it known that I, ARCHIBALD J. ROBERTSON, a subject of the Queen of Great Britain, resident at the city, county, and State of New York, have invented certain new and useful Improvements in Electric Railroads and the Cars to be Operated Thereon, the object being to do away with the necessity for poles and overhead wires, and at the same time preserving all the utility and electrical force produced and transmitted by the present system, also preserving the contact continually, which assures a perfect electrical connection, keeping the wire in an improved condition and preventing the possibility of its coming in contact with street traffic, and at the same time serving the purpose of an overhead wire and keeping it at all times in an improved condition, it being protected from ice and snow, as fully set forth in the following specification, reference being had to the accompanying drawings, forming a part hereof.

Figure 1 is a side elevation of a car, showing my device attached, also a conduit or receptacle in which the main conductor-wire is inclosed. Said conduit or receptacle is fastened in the center of the track to the ties; but the rail is not here shown. Fig. 2 is the generator. Fig. 3 is a section of the track, showing the ties, rails, and ground return-conductor attached to the copper tie-wire, which is riveted to each rail, making a perfect electrical connection. The return-wire is situated at or near the center of the track above or resting on the ties. The main conductor-wire is always resting at a point inside of the conduit or receptacle on insulating material, except where it is resting on the pulley, as shown in Fig. 1. Fig. 4 is a cross-section of the conduit, showing the insulating material forming the lining therein; and Fig. 5 is a sectional view of the carrier-pulley, showing the preferred mode of insulating it. These views are on a larger scale than the principal figures.

A is the main conductor-wire.
B is the return conductor-wire.
C is the carrier-pulley for main conductor.
D is the guide-pulleys for main conductor-wire when rounding curves.
E is a brush continually brushing out conduit or receptacle for main conductor A.

F is the trolley, which is continually in contact with main conductor-wire while in motion.
G is the car-motors.
H is the car-wheels.
I is supporting-brackets and spring-casing for car-body.
J is to represent frame-work of car-truck.
K is the conduit or receptacle for main conductor-wire A.
L is the ties on railroad-bed.
M is an underground basin or receiver for sweepings accumulated by brush E.
N is the rails.

When the parts are assembled, the electric and mechanical operation of the parts are as follows: The current starts from the positive brush of the generator, as shown in Fig. 2, and passes out through the main conductor A, which is inclosed and resting on suitable insulating bearings within conduit or receptacle K, as shown by the arrows, which indicate the direction of the current, and when it reaches the point O, where the trolley of the motor-car is in contact with the main conductor, here it divides, a portion of the current passing up through the trolley F to the motors G G, and after passing through the motors, it reaches the rails through the wheels, and passes along through the rails and through the return supplementary wire B back to the negative brush of the generator, as shown in Fig. 2, the main portion of which divided at letter O, and passes on and to other cars upon the line in the same manner, the return current being carried by the rails, each car taking from the main conductor the amount of current needed to develop the required power to operate the car. It will be observed that main conductor A is lying inclosed in conduit or receiver K on suitable insulating-bearings, the entire length of the line, except at the point over which the car is passing, and at that point it is carried a little distance above the conduit or receptacle, which distance would be determined by the diameter of carrier-pulley C, the periphery of which has a concave face to receive the main wire conductor. This pulley is attached and journaled by proper bearings to a bracket which is fastened at any convenient point to the truck-frame that will permit carrier-pulley C to hang vertically over the center of the track, so that a perpendicular line through its center would strike the center of the slot in conduit or receptacle K, out of which main conductor-wire A rises as carrier-pulley C approaches, and into which it again drops when pulley C has passed, and on which it rests continually be the car still or in motion. By this means at no time can main conductor C come in contact with surface traffic, for it takes its rise from the receiver or conduit K under the car, and is deposited in it under the car also, and so on *ad infinitum*. I also supply pulleys D for the purpose of controlling the distance or length of main conductor A from the point it rises out of the conduit or receiver until it is deposited in it again. They also serve, being flanged, to keep the main conductor-wire in the center of the slot of the receiver when rounding curves. In addition, two pulleys may be added properly journaled and on an angle to suit the main conductor, one on each side. In such case they could be adjusted perfectly to suit the curve and would not come into use except when going around a curve, while pulley D is always in motion when the cars are moving. These pulleys C and D will be suitably suspended from the truck-frame at the most convenient point, and so adjusted that main conductor A will not be bound in any way, but lie naturally and glide freely. Momentum will be given them all by their contact with main conductor A. They should be of light construction and sensitive bearings, and, if desired, may be driven at the desired speed from the car motion. If desired, they may be made of non-conductive material or insulated where the wire comes in contact with them. It is therefore obvious that the wire is always in good condition and kept in positive and continuous contact with trolley F, which assures a positive and uninterrupted electric current.

I prefer to make the pulley C wholly of some hard insulating material, as represented in Fig. 5; but it will suffice if the surface thereof on which the conductor A rests be insulated from its shaft C. The pulleys D may be constructed in the same manner as pulley C.

In Fig. 4, *k* represents the insulating-lining of the conduit K.

I also supply brush E, which is attached to the truck-frame and is passed down through the slot in the conduit or receiver K; or when the car is standing over one of the basins it may be passed up through the slot and adjusted at the proper place. By this means a larger brush may be used, which by the motion of the car is continuously sweeping any dust or dirt that may come into the receiver through the wire slot into the underground basin, thereby keeping the conduit or receiver clean. These basins may be at any desired distance apart, and over which and in the bottom of the conduit or receiver there is a hole cut through which falls the particles of dust or other materials which may have been accumulated by brush E as it continues to pass by the basin, which is so arranged as to be open at will and cleaned out.

Receiver or conduit K will be partially lined on the inside with insulating material suitably arranged, on which the main conductor wire A will rest, so that at no time can it come in contact with material that will affect the current. Therefore the supply of the electric current will flow uninterrupted.

I am aware that there has been tried other conduits in closing wires with the plow and other contacts with the car-motor which has not been successful from the fact that an underground contact meets with obstructions which break the current. My contact is above ground and the main conductor completely insulated. Therefore the breaking of the current or contact is impossible. The contact of the trolley of the motor with the main conductor-wire being at all times undisturbed, being located under the car and out of casual sight. Pulleys D may be dispensed with entirely, if so desired, but in such case pulleys C will be made of small diameter where main conductor A rests, and its periphery very deeply flanged, the said flanges on each side of the wire track on its periphery being of sufficient angle to compensate for the curve in the track. In such case pulley C, for example, being only three inches in diameter, the main conductor A would be raised only that distance above the surface of the ground with which conduit or receptacle K is level.

What I claim is—

1. In electric railways and cars, the combination, with the track-rails, an open receiver extending longitudinally thereof and provided with insulation for a main conductor, and the naked slack main conductor arranged in said receiver and extending lengthwise thereof, of a car-truck mounted on said track-rails, an insulated carrier-pulley mounted on said truck and arranged above the level of said receiver, the elevated bight of the conductor taking over and resting on said pulley, an electric motor on said truck and the trolley of said motor, said trolley resting on the elevated portion of said conductor, whereby when the car-truck moves along the track the carrier-pulley underruns the conductor and keeps it in contact with the trolley, the main conductor rising out of and falling back into said receiver as the car moves along, as set forth.

2. In electric railways and cars, the combination, with the track-rails, an open receiver extending longitudinally thereof and provided with insulation for a main conductor, and a naked slack main conductor arranged in said receiver and extending lengthwise thereof, of a car-truck mounted on said track-rails, an insulated carrier-pulley mounted on said truck and arranged above said receiver, the elevated bight of the conductor resting on said pulley, guide-pulleys carried by the truck and resting on the elevated portion of the conductor, respectively, in front of and behind the carrier-pulley, an electric motor on the truck, and the trolley of said motor resting on the elevated portion of the conductor near the carrier-pulley, substantially as set forth.

3. In electric railways and cars, the combination, with the track-rails, a slitted conduit K, lined with insulating material and extending longitudinally of the track between the rails, and a slack naked conductor A, arranged in and extending lengthwise of said conduit, of a car-truck mounted on said track-rails, a carrier-pulley C, pendent from said truck and supporting the elevated bight of said conductor, an electric motor on said truck and the trolley of said motor, said trolley resting on the elevated portion of said conductor, substantially as set forth.

4. In electric railways and cars, the combination, with the track-rails, a slitted conduit extending longitudinally of the track and provided with a lining of insulating material, and a naked slack conductor arranged in and extending longitudinally of said conduit, of a truck mounted on said track-rails, an insulated carrier-pulley C pendent from said truck and supporting the elevated bight of said conductor, an electric motor on said truck, the trolley of said motor resting on the elevated portion of said conductor, and a brush E pendent from said truck and extending down into the conduit and touching the bottom of the same at the point where the conductor is elevated, substantially as set forth.

ARCHIBALD J. ROBERTSON.

Witnesses:
CHARLES C. DODGE,
IRA TAYLER.